(12) United States Patent
Lee

(10) Patent No.: US 12,542,298 B2
(45) Date of Patent: Feb. 3, 2026

(54) ELECTRODE ASSEMBLY AND METHOD FOR MANUFACTURING THE SAME

(71) Applicant: LG Energy Solution, Ltd., Seoul (KR)

(72) Inventor: Han Young Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 716 days.

(21) Appl. No.: 17/783,484

(22) PCT Filed: Dec. 21, 2020

(86) PCT No.: PCT/KR2020/018765
§ 371 (c)(1),
(2) Date: Jun. 8, 2022

(87) PCT Pub. No.: WO2021/187726
PCT Pub. Date: Sep. 23, 2021

(65) Prior Publication Data
US 2023/0010746 A1 Jan. 12, 2023

(30) Foreign Application Priority Data

Mar. 18, 2020 (KR) ........................ 10-2020-0033378

(51) Int. Cl.
*H01M 10/00* (2006.01)
*H01M 10/04* (2006.01)
*H01M 50/466* (2021.01)

(52) U.S. Cl.
CPC ... *H01M 10/0454* (2013.01); *H01M 10/0459* (2013.01); *H01M 50/466* (2021.01)

(58) Field of Classification Search
CPC ...... H01M 10/04; H01M 50/466; Y02E 60/10
See application file for complete search history.

(56) References Cited

U.S. PATENT DOCUMENTS

| 5,300,373 A | 4/1994 | Shackle |
| 5,958,088 A | 9/1999 | Vu et al. |

(Continued)

FOREIGN PATENT DOCUMENTS

| CN | 107204486 A | 9/2017 | |
| EP | 1022798 A2 * | 7/2000 | .......... H01M 10/052 |

(Continued)

OTHER PUBLICATIONS

Hasebe et al., Nonaqueous Electrolyte Secondary Battery, Jul. 2000, See the Abstract. (Year: 2000).*

(Continued)

*Primary Examiner* — Tiffany Legette
*Assistant Examiner* — Monique M Wills
(74) *Attorney, Agent, or Firm* — Lerner David LLP

(57) ABSTRACT

An electrode assembly according to an embodiment of the present invention for achieving the above object includes: a first electrode formed in the form of a single sheet and repetitively in-folded and out-folded at a predetermined interval; a second electrode provided in plurality and respectively interposed in spaces formed by folding the first electrode; a separator formed in the form of a single sheet and interposed between the first electrode and the second electrode so as to be repetitively in-folded and out-folded at a predetermined interval together with the first electrode; and a cover part configured to cover at least portions of an area, on which the separator is out-folded and an exposed surface, which is exposed to the outside together with the second electrode.

15 Claims, 7 Drawing Sheets

(56) References Cited

U.S. PATENT DOCUMENTS

| | | |
|---|---|---|
| 2005/0175902 A1 | 8/2005 | Parsian |
| 2007/0154790 A1 | 7/2007 | Jeung et al. |
| 2007/0231684 A1 | 10/2007 | Takano et al. |
| 2011/0305938 A1 | 12/2011 | Yamamoto et al. |
| 2014/0242433 A1 | 8/2014 | Kwon et al. |
| 2014/0272537 A1* | 9/2014 | Kretschmar ........ H01M 50/538 429/149 |
| 2014/0272559 A1* | 9/2014 | Kretschmar ........ H01M 4/0407 429/246 |
| 2015/0140452 A1 | 5/2015 | Park et al. |
| 2016/0276702 A1 | 9/2016 | Nakai et al. |
| 2016/0380241 A1 | 12/2016 | Yun |
| 2017/0047628 A1 | 2/2017 | Park et al. |
| 2017/0047629 A1 | 2/2017 | Park et al. |
| 2017/0271708 A1 | 9/2017 | Yoshima et al. |
| 2018/0083255 A1 | 3/2018 | Kim et al. |
| 2019/0058230 A1 | 2/2019 | Park et al. |
| 2019/0067767 A1 | 2/2019 | Park et al. |
| 2019/0189976 A1 | 6/2019 | Cho et al. |

FOREIGN PATENT DOCUMENTS

| | | | | |
|---|---|---|---|---|
| JP | 3338071 B2 * | 10/2002 | ............. | Y02E 60/10 |
| JP | 2004207119 A | 7/2004 | | |
| JP | 2005190912 A | 7/2005 | | |
| JP | 2007273320 A | 10/2007 | | |
| JP | 2010067443 A | 3/2010 | | |
| JP | 2010199281 A | 9/2010 | | |
| JP | 2012156405 A | 8/2012 | | |
| JP | 2016143491 A | 8/2016 | | |
| JP | 2016173923 A | 9/2016 | | |
| JP | 2019046624 A | 3/2019 | | |
| JP | 2019053819 A | 4/2019 | | |
| JP | 2020013705 A * | 1/2020 | ............... | B66D 3/16 |
| KR | 20010041600 A | 5/2001 | | |
| KR | 20070073169 A | 7/2007 | | |
| KR | 20070108751 A | 11/2007 | | |
| KR | 20110135346 A | 12/2011 | | |
| KR | 20140074220 A | 6/2014 | | |
| KR | 20160024089 A | 3/2016 | | |
| KR | 20160099970 A | 8/2016 | | |
| KR | 20170002140 A | 1/2017 | | |
| KR | 20170019791 A | 2/2017 | | |
| KR | 20180032083 A | 3/2018 | | |
| KR | 20180050133 A | 5/2018 | | |
| KR | 20190073075 A | 6/2019 | | |
| KR | 20190079961 A | 7/2019 | | |
| WO | 9407276 A1 | 3/1994 | | |
| WO | WO-2015071284 A1 * | 5/2015 | .......... | H01M 10/045 |

OTHER PUBLICATIONS

Okumura et al., Stacked Battery, Jan. 2020, See the Abstract. (Year: 2000).*

Baumeister et al., Electrode Assembly, Method for the Production Thereof, and Electrochemical Cell, May 2015, See the Abstract. (Year: 2015).*

Yamashita, Battery, Oct. 2002, See the Abstract. (Year: 2002).*

Extended European Search Report including Written Opinion for Application No. 20925047.1 dated May 2, 2024, pp. 1-8.

Search Report dated May 24, 2024 from the Office Action for Chinese Application No. 202080079383.X issued May 28, 2024, 3 pages.

International Search Report for Application No. PCT/KR2020/018765 mailed Apr. 12, 2021, pp. 1-3.

* cited by examiner

ELECTRODE ASSEMBLY AND METHOD FOR MANUFACTURING THE SAME

CROSS-REFERENCE TO RELATED APPLICATION

The present application is a national phase entry under 35 U.S.C. § 371 of International Application No. PCT/KR2020/018765, filed on Dec. 21, 2020, published in Korean, which claims priority to Korean Patent Application No. 10-2020-0033378, filed on Mar. 18, 2020, which are hereby incorporated by reference herein in their entireties.

TECHNICAL FIELD

The present invention relates to an electrode assembly and a method for manufacturing the same, and more particularly, to an electrode assembly that is capable of preventing an electrode from being damaged, such as an occurrence of wrinkles or swells on the electrode due to a taping process or deintercalation of an active material of the electrode and a method for manufacturing the same.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture a secondary battery, an electrode assembly is accommodated in a battery case, and an electrolyte is injected, and then, the battery case is sealed. Also, in order to manufacture the electrode assembly, first, positive electrode active material slurry is applied to a positive electrode collector, and negative electrode active material slurry is applied to a negative electrode collector to manufacture a positive electrode and a negative electrode, respectively. A separator is interposed between the positive electrode and the negative electrode to manufacture the electrode assembly. Such electrode assemblies are classified into various types. For example, the various types of electrode assemblies include a simple stack type electrode assembly, in which positive electrodes, separators, negative electrodes are simply intersected and stacked continuously without manufacturing a unit cell, a lamination & stack (L&S) type electrode assembly, in which unit cells are manufactured first using positive electrodes, separators, and negative electrodes and then are stacked, and a stack & folding (S&F) type, in which a plurality of unit cells are attached at a predetermined interval on one surface of a separator film having a long length and repetitively folded from an one end of the separator film in the same direction.

FIG. 1 is a perspective view of an electrode assembly 30 according to the related art, and FIG. 2 is a front view of the electrode assembly 30 according to the related art.

The existing simple stack type or lamination & stack type electrode assembly 30 has a simple structure and a high degree of impregnation of an electrolyte, but has a problem in that the production speed is slow, and a degree of alignment is lowered. In order to maintain the alignment of the plurality of stacked electrodes and separators of the electrode assembly 30, a taping process is performed. Then, as illustrated in FIG. 1, the tape 31 is attached to each of both surfaces and portions of the top and bottom surfaces of the electrode assembly 30.

However, in the simple stack type or lamination and stack type electrode assembly 30, each of the negative electrode and the separator has a width that is relatively wider than that of the positive electrode. Therefore, since a peripheral portion protrudes to the outside, if the tape 31 is attached, there is a problem in that the electrode is damaged, such as an occurrence of wrinkles or swells or eintercalation of an active material of the electrode.

In addition, the tape 31 may be detached later in an electrolyte injection process or degassing process. Particularly, since a gas within the case has to be discharged to the outside in the degassing process, there is a problem in that the tape 31 is more easily detached by a flow of the gas.

The stack & folding electrode assembly has a high production speed and high structural stability, but there is a problem in that the process is complicated, and the degree of alignment and the degree of impregnation of the electrolyte are lowered.

PRIOR ART DOCUMENTS (Patent Document 1) Korea Patent Publication No. 2011-0135346

DISCLOSURE OF THE INVENTION

Technical Problem

An object of the prevent invention for solving above problems is to provide an electrode assembly that is capable of preventing an electrode from being damaged, such as an occurrence of wrinkles or swells on the electrode due to a taping process or deintercalation of an active material of the electrode and a method for manufacturing the same.

The objects of the present invention are not limited to the aforementioned object, but other objects not described herein will be clearly understood by those skilled in the art from descriptions below.

Technical Solution

An electrode assembly according to an embodiment of the present invention for achieving the above object includes: a first electrode formed in the form of a single sheet and repetitively in-folded and out-folded at a predetermined interval; a second electrode provided in plurality and respectively interposed in spaces formed by folding the first electrode; a separator formed in the form of a single sheet and interposed between the first electrode and the second electrode so as to be repetitively in-folded and out-folded at a predetermined interval together with the first electrode; and a cover part configured to cover at least portions of an area, on which the separator is out-folded and an exposed surface, which is exposed to the outside together with the second electrode.

Also, the cover part may be formed in the form of a single film.

Also, both ends of the cover part may be attached to both ends of the first electrode, respectively.

Also, the cover part may be in close contact with the exposed surface.

Also, the cover part may include at least one of epoxy, polyimide, polyethylene terephthalate (PET), polypropylene (PP), or polytetrafluoroethylene (PTFE).

Also, the first electrode may be a single-sided electrode on which a first electrode active material is applied to only one surface of a first electrode collector, and the second electrode may be a double-sided electrode on which a second electrode active material is applied to both surfaces of a second electrode collector.

Also, the second electrode may be interposed only in each of spaces formed by in-folding the first electrode.

Also, the separator may be interposed between one surface of the first electrode, to which the first electrode active material is applied, and the second electrode.

Also, in the first electrode and the separator, each of areas on which one end of the second electrode may be disposed is in-folded, and each of areas on which the other end of the second electrode may be disposed is out-folded.

Also, the cover part may cover the exposed surface through which the other end of the second electrode is exposed to the outside.

A method for manufacturing an electrode assembly according to an embodiment of the present invention for achieving the above object includes: a step of stacking a separator formed in the form of a single sheet on one surface of a first electrode formed in the form of a single sheet in the same direction; a step of seating a plurality of second electrodes to be spaced a predetermined interval from each other on the separator so as to form an electrode stack; a step of in-folding and out-folding the first electrode and the separator to fold the electrode stack; and a step of covering at least portions of an area, on which the separator is out-folded, and an exposed surface, which is exposed to the outside together with the second electrode, through a cover part among surfaces of the electrode stack.

Also, the step of covering the at least portions through the cover part may be performed by attaching both ends of the cover part formed in the form of a single film to both ends of the first electrode.

Also, the step of covering the at least portions through the cover part may include: a step of applying a cover material that is in a liquid state to at least a portion of the exposed surface; and a step of drying the cover material to form the cover part.

Also, in the step of stacking the separator, the separator may be stacked on one surface on which a first electrode active material is applied on the first electrode.

Also, the predetermined interval may be longer than a length of the second electrode.

Particularities of other embodiments are included in the detailed description and drawings.

Advantageous Effects

According to the embodiments of the present invention, there are at least the following effects.

Since the first electrode is formed in the form of a single sheet, it is unnecessary to fix the electrode assembly by using the tape, and thus, the electrode may be prevented from being damaged, such as the occurrence of the wrinkles or the swells on the electrode or the deintercalation of the active material of the electrode.

In addition, since the first electrode is the single-sided electrode, the unnecessary electrode active material may not be formed on the outermost side of the electrode assembly to improve the energy density relative to the volume.

In addition, since it is unnecessary to manufacture the unit cell first, the continuous process may be easy, and the process time may be saved.

In addition, since the cover part covers the area on which the separator is out-folded and the exposed surface, which is exposed to the outside together with the second electrode, the phenomenon in which the separator is rolled into the sealing part may be prevented from occurring when the degassing process is performed later.

The effects of the prevent invention are not limited by the aforementioned description, and thus, more varied effects are involved in this specification.

MODE FOR CARRYING OUT THE INVENTION

Figure 1:
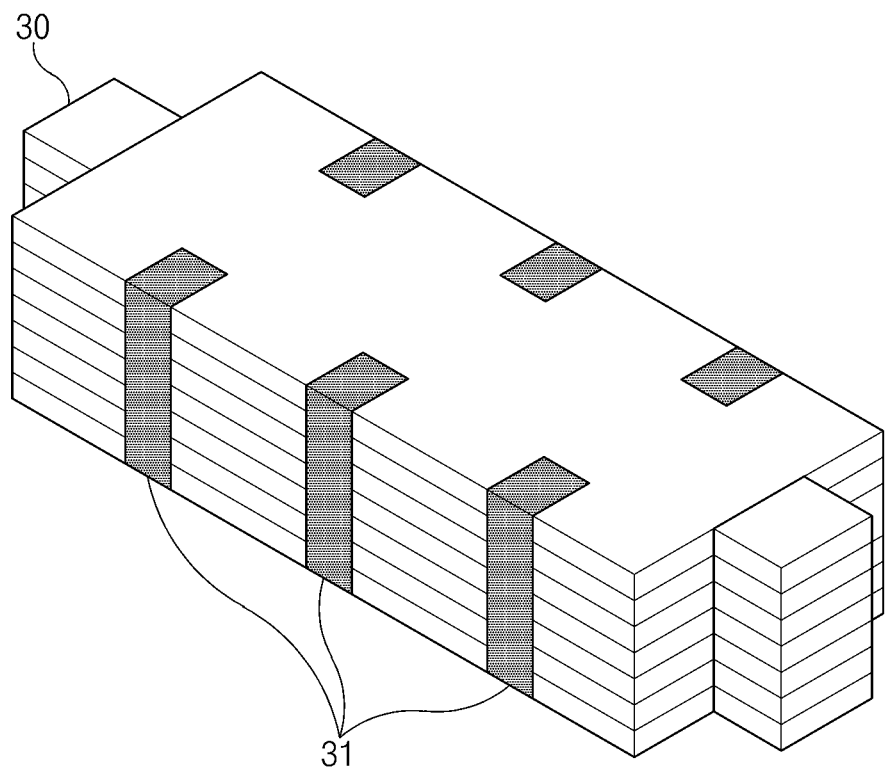
FIG. 1 is a perspective view of an electrode assembly according to a related art.
Figure 2:
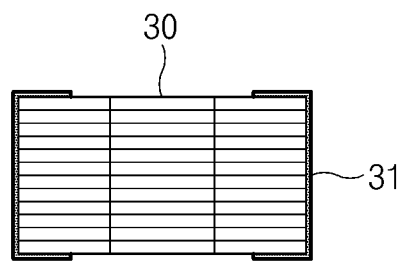
FIG. 2 is a front view of the electrode assembly according to the related art.

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

Figure 3:
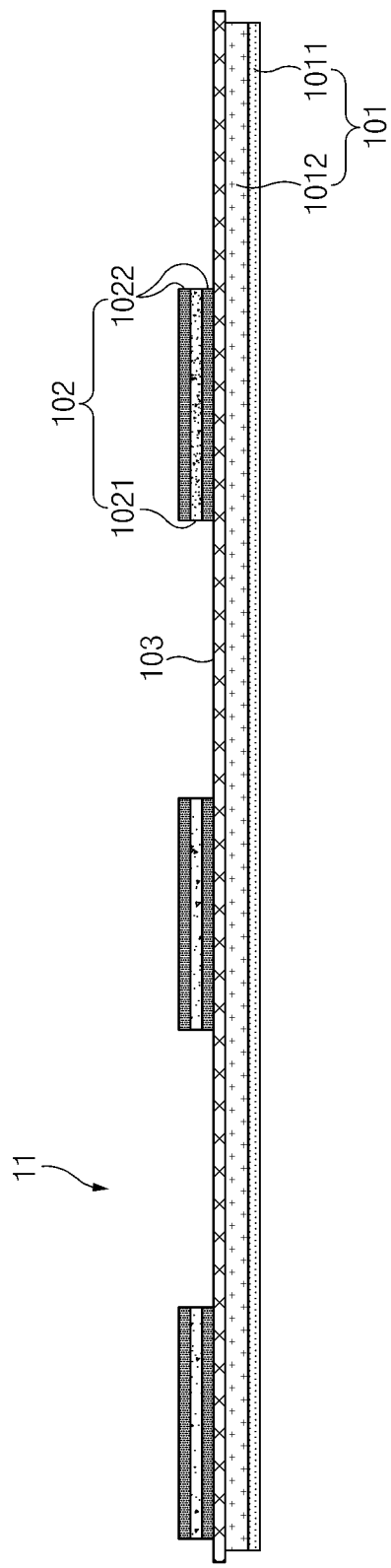
FIG. 3 is a schematic view illustrating an electrode stack according to an embodiment of the present invention.

FIG. 3 is a schematic view illustrating an electrode stack 11 according to an embodiment of the present invention.

According to an embodiment of the present invention, since a first electrode 101 is formed in the form of a single sheet, it is unnecessary to fix the electrode to the electrode assembly by using a tape, thereby preventing the electrode from being damaged, such as an occurrence of wrinkles or swells on the electrode or deintercalation of an active material of the electrode. In addition, since the first electrode 101 is the single-sided electrode, an unnecessary electrode active material may not be formed on the outermost side of the electrode assembly 10 to improve an energy density relative to a volume. In addition, since it is unnecessary to manufacture a unit cell first, a continuous process may be easy, and a process time may be saved. In addition, since a cover part covers an area on which a separator 103 is out-folded and an exposed surface, which is exposed to the outside together with a second electrode 102, a phenomenon in which the separator 103 is rolled into a sealing part may be prevented from occurring when a degassing process is performed later.

For this, a method for manufacturing the electrode assembly 10 according to an embodiment of the present invention includes: a step of stacking the separator 103 formed in the form of a single sheet on one surface of the first electrode 101 formed in the form of a single sheet in the same direction; a step of seating a plurality of second electrodes 102 to be spaced a predetermined interval from each other on the separator 103 so as to form an electrode stack 11; a step of in-folding and out-folding the first electrode 101 and the separator 103 to fold the electrode stack 11; and a step of covering at least portions of an area, on which the separator 103 is out-folded, and an exposed surface, which is exposed to the outside together with the second electrode 102, through a cover part 104 among surfaces of the electrode stack 11.

The electrode assembly 10 manufactured through the above-described method according to an embodiment of the present invention includes a first electrode 101 formed in the form of a single sheet and repetitively in-folded and out-folded at a predetermined interval; a second electrode 102 provided in plurality and respectively interposed in spaces formed folding the first electrode 101; a separator 103 formed in the form of a single sheet and interposed between the first electrode 101 and the second electrode 102 so as to be repetitively in-folded and out-folded at a predetermined interval together with the first electrode 101; and a cover part 104 covering at least portions of an area, on which the separator 103 is out-folded and an exposed surface, which is exposed to the outside together with the second electrode 102.

As described above, in order to manufacture the electrode assembly 10, first, positive electrode active material slurry is applied to a positive electrode collector, and negative electrode active material slurry is applied to a negative electrode collector to manufacture a positive electrode and a negative electrode, respectively. The separator 103 is interposed between the positive electrode and the negative electrode, and the separator 103 and the electrodes may be stacked to manufacture the electrode assembly 10.

Both the electrodes of the positive and negative electrodes used in the present invention are not particularly limited, and the electrode active material may be prepared in a shape that is bonded to the electrode collector according to the typical method that is known in the art. Here, the positive electrode may be manufactured by, for example, applying slurry, in which a positive electrode active material, a conductive agent, and a binder are mixed, onto a positive electrode collector, and then drying and pressing the slurry. At this time, if necessary, the slurry may further include a filler. The positive electrode may be manufactured in the form of a sheet and mounted on a roll.

The positive electrode collector generally has a thickness of 3 µm to 500 µm. The positive electrode collector is usually made of a material having high conductivity without causing a chemical change. Such a material may be surface-treated with, for example, stainless steel, aluminum, nickel, titanium, calcined carbon, or aluminum or stainless steel on which carbon, nickel, titanium, silver, or the like is surface-treated on a surface thereof, but is not limited thereto. Also, the positive electrode collector may form a fine unevenness on a surface thereof to increase in adhesion of the positive electrode active material. Also, the positive electrode collector may have various shapes such as a film, a sheet, a foil, a net, a porous body, a foam, a non-woven fabric, and the like.

In a case of a lithium secondary battery, the positive electrode active material may include, for example, a layered compound of lithium cobalt oxide ($LiCoO_2$), lithium nickel oxide ($LiNiO_2$), etc., or a substituted compound with one or more transition metals; lithium manganese oxide such as $Li_{1+x}Mn_{2-x}O_4$ (x is 0 to 0.33), $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$, etc.; Ni site-type lithium nickel oxide represented by Chemical Formula $LiNi_{1-x}M_xO_2$ (M=Co, Mn, Al, Cu, Fe, Mg, B or Ga, and x=0.01 to 0.3); lithium manganese complex oxide represented by Chemical Formula $LiMn_{2-x}M_xO_2$ (M=Co, Ni, Fe, Cr, Zn or Ta, and x=0.01 to 0.1) or $Li_2Mn_3MO_8$ (M=Fe, Co, Ni, Cu or Zn); $LiMn_2O_4$ in which a portion of Li is substituted with alkaline earth ions; a disulfide compound; $Fe_2(MoO_4)_3$, and the like. However, this embodiment is not limited thereto.

The conductive agent is generally added at 1 wt % to 50 wt % based on the total weight of the mixture including the positive electrode active material. The conductive agent is usually made of a material having conductivity without causing a chemical change. The conductive agent may include, for example, conductive materials such as: graphite such as natural graphite and artificial graphite; carbon black such as acetylene black, Ketjen black, furnace black, channel black, lamp black, and thermal black; conductive fiber such as carbon fiber and metal fiber; metal powder such as carbon fluorine, aluminum, and nickel powder; conductive whisker such as zinc oxide and potassium titanate; conductive oxide such as titanium oxide; or polyphenylene derivatives.

The binder is a component assisting the bonding of the active material to the conductive agent and the bonding to the collector and is commonly added at 1 wt % to 50 wt % based on the total weight of the mixture including the positive electrode active material. Examples of the binder may include polyfluoro vinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated EPDM, styrene butadiene rubber, fluorine rubber, various copolymers, and the like.

The filler is optionally used as a component that inhibits expansion of the positive electrode. Also, a general filler may be used if the filler is a fibrous material without causing the chemical change. Examples of the filler may include olefin polymers such as polyethylene and polypropylene; and fibrous materials such as glass fibers and carbon fibers.

The negative electrode may be manufactured by, for example, applying the negative electrode active material onto the negative electrode collector and then drying and pressing the negative electrode active material. If necessary, the negative electrode active material may optionally include the conductive agent, the binder, the filler, and the like. The negative electrode may be manufactured in the form of a sheet and mounted on a roll.

The negative electrode collector generally has a thickness of 3 μm to 500 μm. The negative electrode collector is usually made of a material having conductivity without causing a chemical change. Examples of the material include copper, stainless steel, aluminum, nickel, titanium, calcined carbon, copper or stainless steel on which carbon, nickel, titanium, silver, or the like is surface-treated on a surface thereof, or aluminum-cadmium alloys. Also, the negative electrode collector may form a fine unevenness on the surface thereof to increase in bonding force of the negative electrode active material. Also, the negative electrode collector may have various shapes such as a film, a sheet, a foil, a net, a porous body, a foam, or a non-woven fabric.

The negative electrode active material may include, for example, carbon such as non-graphitized carbon, graphite-based carbon, etc.; a metal complex oxide such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0<x\le1$; $1\le y\le 3$; $1\le z\le 8$), etc.; a lithium metal; a lithium alloy; a silicon-based alloy; a tin-based alloy; a metal oxide such as $SnO$, $SnO_2$, $PbO$, $PbO_2$, $Pb_2O_3$, $Sb_2O_3$, $Sb_2O_4$, $Sb_2O_5$, $GeO$, $GeO_2$, $Bi_2O_3$, $Bi_2O_4$, $Bi_2O_5$, etc.; a conductive polymer such as polyacetylene, etc.; Li—Co—Ni-based material, and the like.

A commonly known polyolefin-based separator 103 or a composite separator 103 in which an organic and inorganic composite layer is formed on the olefin-based material may be used as the separator 103, which is disposed between the positive electrode and the negative electrode to insulate the electrodes from each other, but is not particularly limited.

The electrode assembly 10 having the above structure is accommodated in a battery case. Then, an electrolyte is injected, and the battery case is sealed to manufacture a secondary battery.

According to an embodiment of the present invention, the first electrode 101 may be a positive electrode, and the second electrode 102 may be a negative electrode, but are not limited thereto. For example, the first electrode 101 may be a negative electrode, and the second electrode 102 may be a positive electrode.

First, as illustrated in FIG. 3, one separator 103 formed in the form of a single sheet is stacked on one surface of the first electrode 101 formed in the form of a single sheet in the same direction. Here, the first electrode 101 is a single-sided electrode in which a first electrode active material 1012 is applied to only one surface of a first electrode collector 1011. Thus, the first electrode active material 1012 is formed on one surface of the first electrode 101, and the first electrode active material 1012 is not formed on the other surface of the first electrode 101. As a result, the first electrode collector 1011 is exposed to the outside. The separator 103 formed in the form of a single sheet is preferably stacked on one surface of the first electrode 101 to which the first electrode active material 1012 is applied.

Then, the plurality of second electrodes 102 are seated to be spaced a predetermined interval from each other on the separator 103 to form an electrode stack 11. Here, the second electrode 102 is a double-sided electrode in which the second electrode active material 1022 is applied to all both surfaces of the second electrode collector 1021. Thus, the second electrode active material 1022 is formed on both one side and the other side of the second electrode 102.

It is preferable that the predetermined interval is longer than a length of the second electrode 102. If the predetermined interval is shorter than the length of the second electrode 102, when the electrode stack 11 is folded later, the second electrode 102 is not evenly aligned and thus protrudes outward. However, if the predetermined interval is longer than the length of the second electrode 102, the second electrode 102 is evenly aligned to reduce a volume, and an area on which the second electrode 102 and the first electrode 101 overlap each other increase to increase in energy density.

Figure 4:
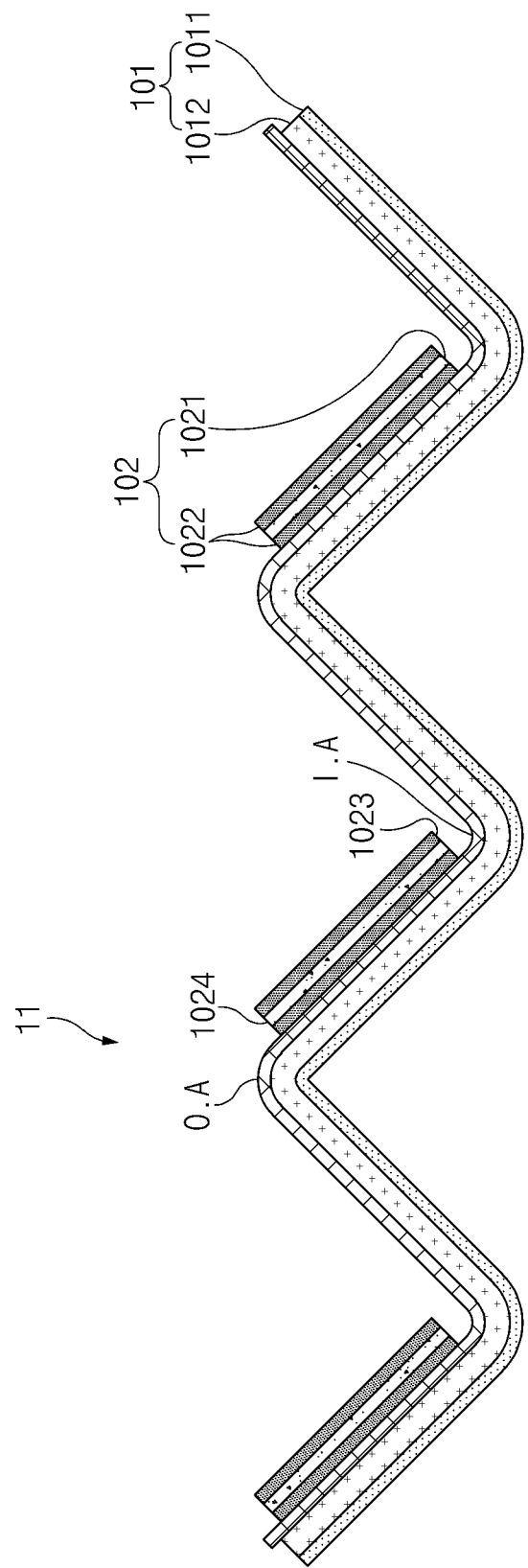
FIG. 4 is a schematic view illustrating a shape in which the electrode stack is folded according to an embodiment of the present invention.
Figure 5:
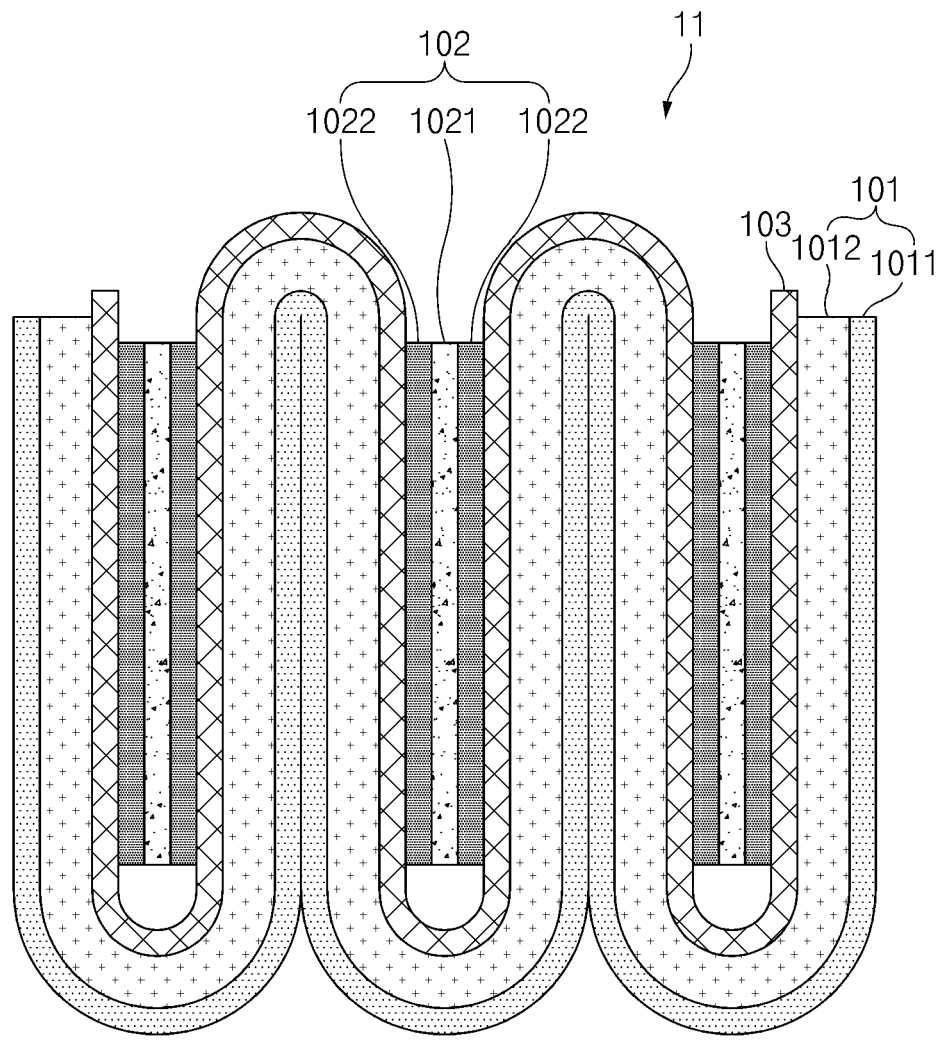
FIG. 5 is a schematic view illustrating a shape in which the electrode stack is completely folded according to an embodiment of the prevent invention.

FIG. 4 is a schematic view illustrating a shape in which the electrode stack 11 is folded according to an embodiment of the present invention, and FIG. 5 is a schematic view illustrating a shape in which the electrode stack 11 is completely folded according to an embodiment of the prevent invention.

As illustrated in FIG. 4, the electrode stack 11 is folded by in-folding and out-folding the first electrode 101 and the separator 103. That is, in the electrode stack 11, the sheet on which the first electrode 101 and the separator 103 are stacked is in-folded at one side and then out-folded in an opposite direction, and then, this process is alternately and repetitively performed. Also, the sheet is continuously folded from one side to the other side thereof. At this time, in the first electrode 101 and the separator 103, each of areas I.A on which one end of the second electrode 102 is disposed may be in-folded, and each of areas O.A on which the other end 1024 of the second electrode 102 may be out-folded. That is, the in-folding areas and the out-folding areas in the first electrode 101 and the separator 103 may be determined according to a position of the second electrode 102.

Herein, the in-folding refers to folding in a direction in which the first electrode 101 surrounds the second electrode 102. Thus, when the in-folding is performed, the separator 103 and the first electrode 101 are sequentially stacked on both the surfaces of the second electrode 102. Also, the out-folding refers to folding in a direction in which the first electrode 101 excludes the second electrode 102 as the contrary concept of the in-folding. Thus, when the out-folding is performed, the first electrode collectors 1011, which are exposed through the other surface of the first electrode 101, are stacked on each other. As illustrated in FIG. 5, the electrode stack 11 may be completely folded in the same manner as described above.

Figure 6:
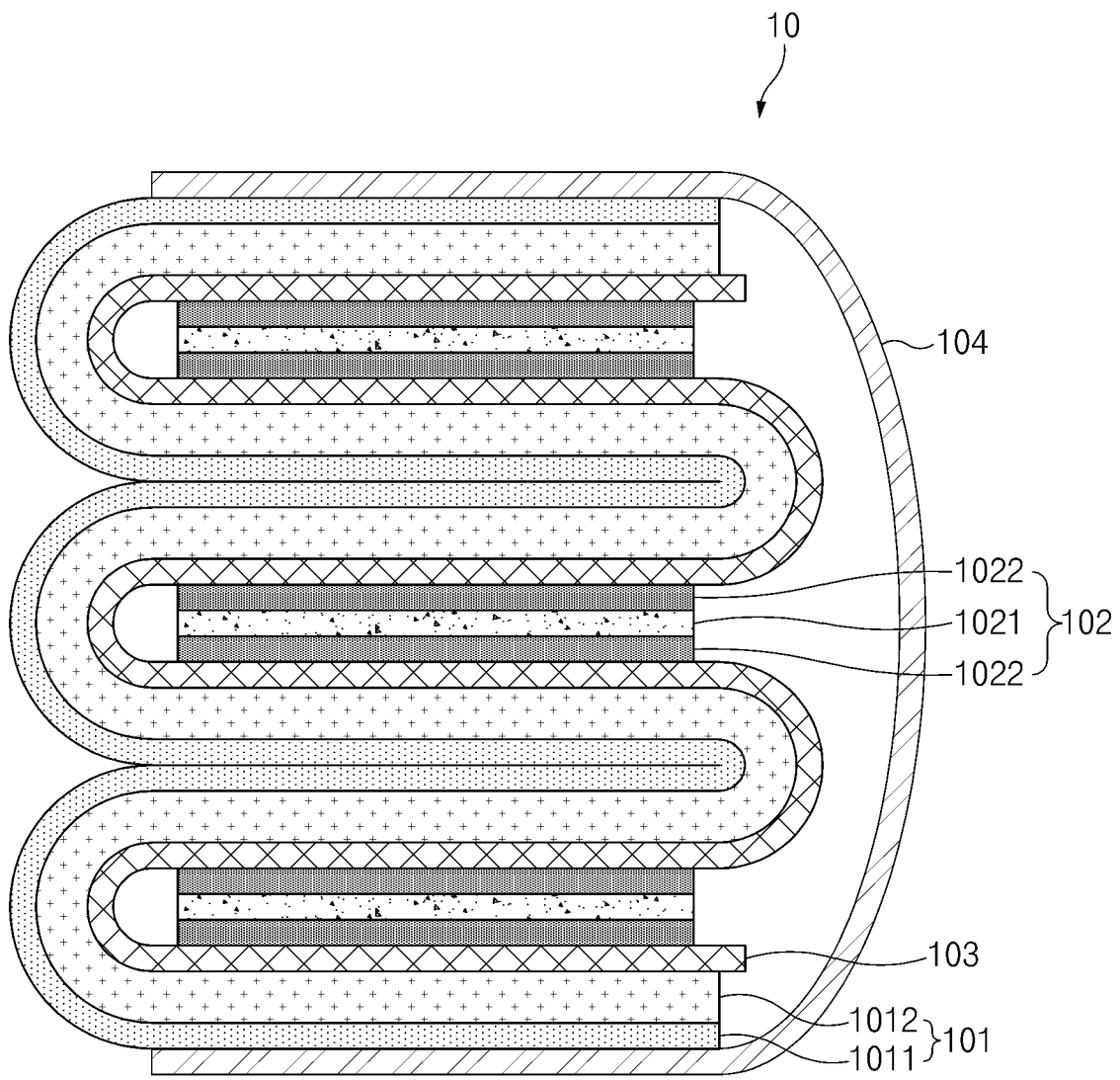
FIG. 6 is a schematic view of an electrode assembly according to an embodiment of the present invention.

FIG. 6 is a schematic view of the electrode assembly 10 according to an embodiment of the present invention.

As illustrated in FIG. 6, among a plurality of surfaces constituting the completely folded electrode stack 11, at least portions of an area O.A on which the separator 103 is out-folded and an exposed surface, which is exposed to the outside together with the second electrode 102 may be covered by the cover part 104. The cover part 104 may be formed in the form of a single film. Also, both ends of the cover part 104 may be attached to both ends of the first electrode 101 to cover the exposed surface. Thus, the electrode assembly 10 according to an embodiment of the present invention may be manufactured.

The electrode assembly 10 includes the first electrode 101, the second electrode 102, the separator 103, and the cover part 104.

The first electrode 101 is a single-sided electrode on which the first electrode active material 1012 is applied to only one surface of the first electrode collector 1011, is formed in the form of a single sheet, and repetitively in-folded and out-folded at a predetermined interval.

The second electrode 102 is a double-sided electrode on which the second electrode active material 1022 is applied to both the surfaces of the second electrode collector 1021, is provided in plurality, and is interposed in a space formed by folding the first electrode 101. Particularly, it is preferable that the second electrode 102 be interposed only in a space formed by in-folding the first electrode 101.

The separator 103 is formed in the form of a single sheet, is interposed between the first electrode 101 and the second electrode 102, and repetitively in-folded and out-folded at a predetermined interval together with the first electrode 101. Particularly, the separator 103 is interposed between one surface of the first electrode 102, to which the first electrode active material 1012 is applied, and the second electrode 102.

In general, both the outermost surfaces of the electrode assembly 10 are not used to generate electricity. However, in the electrode assembly 10 according to an embodiment of the present invention, as illustrated in FIG. 6, the first electrode collector 1011 of the first electrode 101, which is the single-sided electrode, is exposed on both the outermost surfaces. Thus, since the first electrode active material 1012 is not formed on both the outermost surfaces that do not generate electricity, the energy density may increase.

However, according to an embodiment of the present invention, since the electrode collectors are also staked on each other at the out-folded portion of the first electrode 101, the out-folded portion is not used to generate electricity. However, in general, the electrode active material is much thicker than the electrode collector in the electrode. Thus, even if the out-folded portion of the first electrode 101 does not generate electricity, the thickness is much thinner to reduce the volume. That is, the energy density relative to the volume may be further improved.

In addition, since the first electrode 101 and the separator 103 are formed in the form of a single sheet, it is unnecessary to fix the electrode to the electrode assembly by using a tape, thereby preventing the electrode from being damaged, such as an occurrence of wrinkles or swells on the electrode or deintercalation of the active material of the electrode. In addition, since it is unnecessary to manufacture a unit cell first, a continuous process may be easy, and a process time may be saved.

In the first electrode 101 and the separator 103, each of the areas I.A on which one end of the second electrode 102 is disposed is in-folded, and each of the areas O.A on which the other end 1024 of the second electrode 102 is out-folded. Thus, the areas O.A on which the separator 103 is out-folded and the other end 1024 of the second electrode 102 are exposed to the outside.

Among the plurality of surfaces constituting the completely folded electrode stack 11, the areas OA on which the separator 103 is out-folded and the other end 1024 of the second electrode 102 are provided in plurality on the exposed surface and thus are disposed alternately to be exposed together to the outside. Furthermore, as illustrated in FIG. 5, one end or both ends of the separator 103 may also be exposed to the outside through the exposed surface according to the number of times of stacking of the electrode stack 11. Also, the exposed portions of the separator 103 may be detached from each other or damaged due to an external impact. For example, the electrode assembly 10 may be accommodated in a pouch-type battery case and may undergo an activation process, and then a degassing process may be performed. At this time, the electrode assembly 10 inside the battery case may move in a direction in which the electrode assembly 10 is degassed by the degassing process.

If the degassing process is completed in this state, and the sealing part is completely sealed, a phenomenon, in which the exposed separator 103 is rolled into the sealing part, may occur. Here, one end or both ends of the separator 103 may be rolled in, and the area O.A on which the separator 103 is out-folded may be rolled in. Also, due to such a damage, a defect in insulation between the first electrode 101 and the second electrode 102 may occur.

The cover part 104 covers at least a portion of the exposed surface. In particular, in order to prevent the separator 103 and the electrode from being damaged, it is preferable to cover the entire exposed surface. Here, the cover part 104 may be formed in the form of a single film. Also, both ends of the cover part 104 may be attached to both ends of the first electrode 101 to cover the exposed surface. As a result, it is possible to prevent the phenomenon, in which the separator 103 is rolled into the sealing part during the degassing process later, from occurring. However, the present invention is not limited thereto, and the cover part 104 has a shape constituted by a plurality of films and may be attached to be spaced apart from each other on the exposed surface of the electrode stack 11 in a longitudinal length direction of the electrode stack 11. Here, as the spaced interval is narrowed, the phenomenon, in which the separator 103 is rolled into the sealing part, may be reliably prevented from occurring.

As illustrated in FIG. 6, it is preferable that the attachment area of both the ends of the cover part 104 is wide, and it is more preferable to be attached to both the entire outermost surfaces of the electrode assembly 10. Therefore, even if the cover part 104 is in contact with the electrolyte inside the battery case, the cover part 104 may not be detached from the first electrode 101.

The cover part 104 may include at least one of insulating materials such as epoxy, polyimide, polyethylene terephthalate (PET), polypropylene (PP), and polytetrafluoroethylene (PTFE). Thus, even if the electrode is damaged, defective insulation between the first electrode 101 and the second electrode 102 may be prevented.

Figure 7:
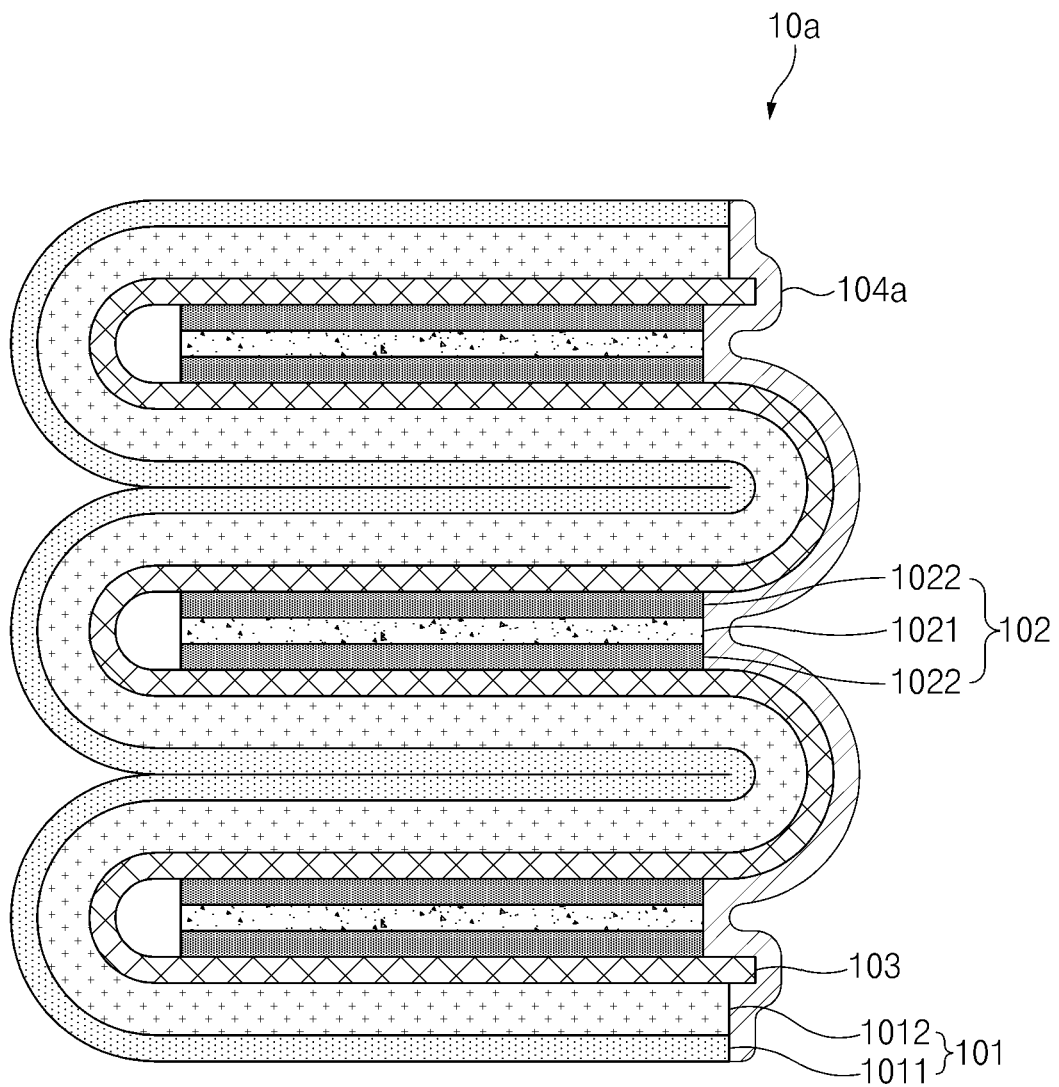
FIG. 7 is a schematic view of an electrode assembly according to another embodiment of the present invention.

FIG. 7 is a schematic view of an electrode assembly 10a according to another embodiment of the present invention.

According to another embodiment of the present invention, when at least a portion of an exposed surface is covered with a cover part 104a, a cover material that is in a liquid state may be applied to at least a portion of the exposed surface. In addition, the cover part 104a may be formed by drying the cover material. Since the cover part 104a is completely in close contact with the exposed surface, it is possible to prevent not only a separator 103 but also the cover part 104a from being rolled into a sealing part during a degassing process later.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

DESCRIPTION OF THE SYMBOLS 10, 30: Electrode assembly 11: Electrode stack
101: First electrode 1011: First electrode collector 1012: First electrode active material 102: Second electrode
1021: Second electrode collector 1022: Second electrode active material
1023: One end of second electrode 1024: The other end of second electrode
103: Separator 104: Cover part
31: Tape

The invention claimed is:

1. An electrode assembly comprising:
a first electrode in the form of a single sheet that is repetitively in-folded and out-folded at a predetermined interval;
a plurality of second electrodes interposed in spaces formed by folding the first electrode;
a separator formed in the form of a single sheet that is interposed between the first electrode and the plurality of second electrodes so as to be repetitively in-folded and out-folded at the predetermined interval together with the first electrode; and
a cover part covering exposed out-folded portions of the separator and exposed end portions of the plurality of second electrodes, the cover part being in the form of a single film, the cover part being adjacent to the exposed out-folded portions of the separator,
wherein the cover part does not contact exposed out-folded portions of the first electrode, and
wherein the cover part is located at a first side of the electrode assembly and not at a second side of the electrode assembly opposite from the first side.

2. The electrode assembly of claim 1, wherein first and second opposite ends of the cover part are attached to first and second opposite ends of the first electrode, respectively.

3. The electrode assembly of claim 1, wherein the cover part comprises at least one of: epoxy, polyimide, polyethylene terephthalate (PET), polypropylene (PP), or polytetrafluoroethylene (PTFE).

4. The electrode assembly of claim 1, wherein the first electrode is a single-sided electrode on which a first electrode active material is applied to only a first surface of a first electrode collector, and the plurality of second electrodes are each a double-sided electrode on which a second electrode active material is applied to first and second opposite surfaces of a second electrode collector.

5. The electrode assembly of claim 4, wherein each of the plurality of second electrodes is interposed only in a corresponding one of a plurality of spaces formed by in-folding the first electrode.

6. The electrode assembly of claim 4, wherein the separator is interposed between the first surface of the first electrode, to which the first electrode active material is applied, and each of the plurality of second electrodes.

7. The electrode assembly of claim 1, wherein each location of the separator and each location of the first electrode at which a first end of each of the plurality of second electrodes is disposed is in-folded, and each location of the separator and each location of the first electrode at which a second end of each of the plurality of second electrodes is disposed is out-folded.

8. The electrode assembly of claim 7, wherein the exposed end portions of the plurality of second electrodes that is covered by the cover part is the second end of each of the plurality of second electrodes.

9. A method for manufacturing an electrode assembly, the method comprising:
stacking a separator in the form of a single sheet on a first surface of a first electrode in the form of a single sheet;
seating a plurality of second electrodes on the separator, the plurality of second electrodes spaced a predetermined interval from each other on the separator so as to form an electrode stack;
in-folding and out-folding the first electrode and the separator to fold the electrode stack; and
covering exposed out-folded portions of the separator and exposed end portions of the plurality of second electrodes with a cover part that is in the form of a single film,
wherein the cover part is adjacent to the exposed out-folded portions of the separator,
wherein the cover part does not contact exposed out-folded portions of the first electrode, and
wherein the cover part is located at a first side of the electrode assembly and not at a second side of the electrode assembly opposite from the first side.

10. The method of claim 9, wherein the covering of the exposed out-folded portions of the separator and the exposed end portions of the plurality of second electrodes with the cover part is performed by attaching first and second opposite ends of the cover part to first and second opposite ends of the first electrode, respectively, the cover part being in the form of a single film.

11. The method of claim 9, wherein the covering of the exposed out-folded portions of the separator and the exposed end portions of the plurality of second electrodes with the cover part comprises:
applying a cover material that is in a liquid state to the exposed out-folded portions of the separator and the exposed end portions of the plurality of second electrodes; and
drying the cover material to form the cover part.

12. The method of claim 9, wherein, during the stacking of the separator on the first electrode, the separator is stacked on the first surface of the first electrode on which a first electrode active material is applied.

13. The method of claim 9, wherein the predetermined interval is longer than a length of each of the plurality of second electrodes in a long direction of the separator.

14. The electrode assembly of claim 1, wherein the cover part contacts the exposed out-folded portions of the separator.

15. The method of claim 9, wherein the cover part contacts the exposed out-folded portions of the separator.

* * * * *